Sept. 17, 1935.   J. C. RAH   2,014,586
LINK CONNECTER AND SAFETY INSULATION FOR SAME
Filed Dec. 8, 1931   2 Sheets-Sheet 1
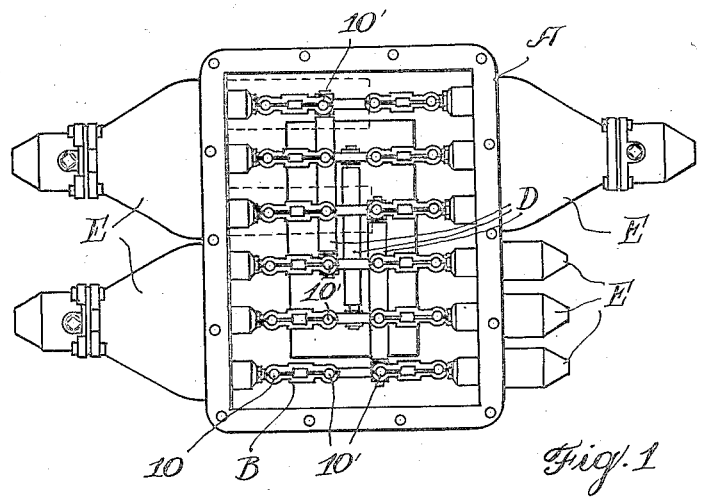
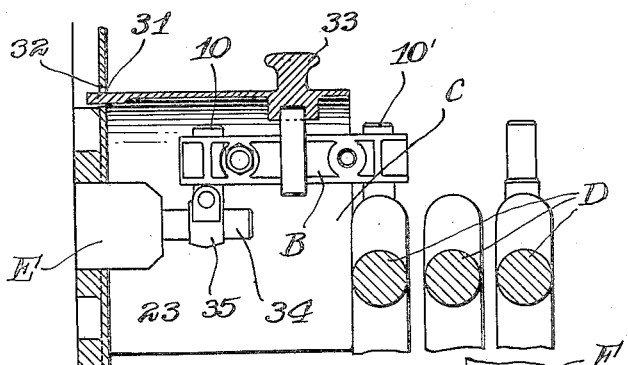
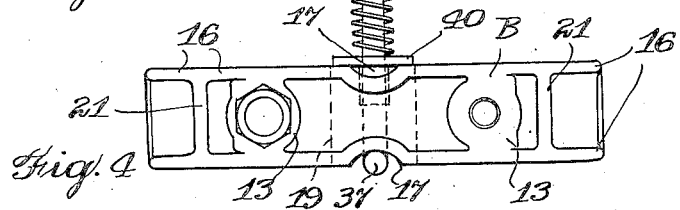
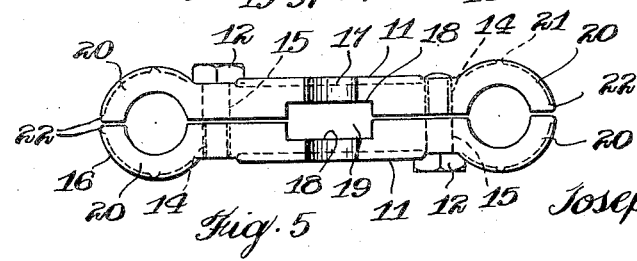
Inventor
Joseph C. Rah
By Howard Lieber
Attorney Sept. 17, 1935. J. C. RAH 2,014,586
LINK CONNECTER AND SAFETY INSULATION FOR SAME
Filed Dec. 8, 1931 2 Sheets-Sheet 2
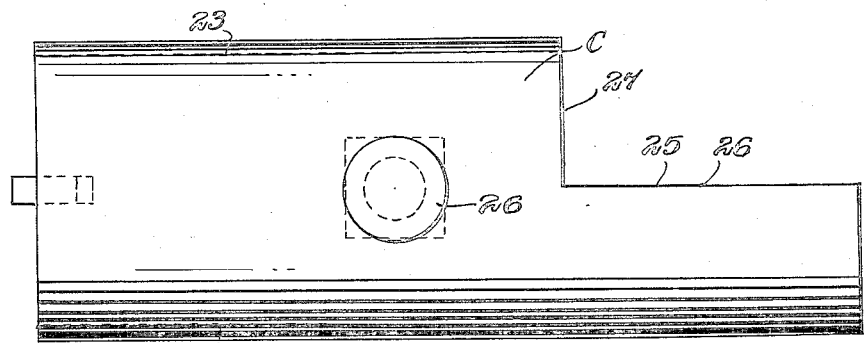
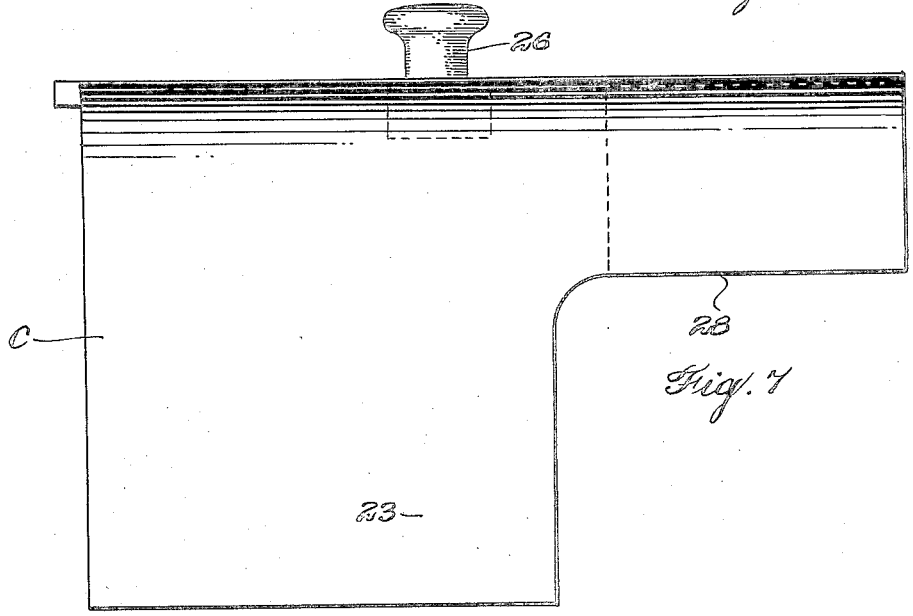
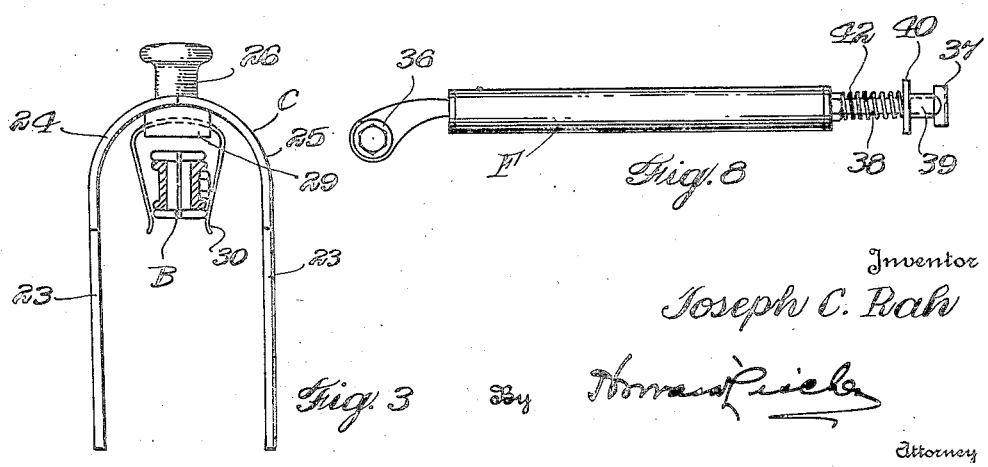

Patented Sept. 17, 1935

2,014,586

UNITED STATES PATENT OFFICE 2,014,586

LINK CONNECTER AND SAFETY INSULATION FOR SAME

Joseph C. Rah, Chicago, Ill., assignor to Delta-Star Electric Company, Chicago, Ill., a corporation of Illinois Application December 8, 1931, Serial No. 579,732

5 Claims. (Cl. 247—1)

This invention relates to a link connecter particularly adapted for underground electric distribution boxes where it is desirable to provide a link connecter between the terminals in the distribution box which may be readily interchanged to connect any of the other terminals which are spaced equidistant, so that the link connecter may be attached between any of the terminals in the distribution box.

In electrical underground distribution boxes of this character where working space is close and the voltages may be of a nature to be dangerous, it is very important that a safety insulation is provided operable with the link in a manner to permit the workmen to operate in the underground box with safety. I have therefore provided a particular safety insulation which is applicable with the link connecter in a peculiar manner so as to cause the same to co-operate with the connecter to permit the link and the insulator to operate together. The safety insulation is of a hood-like nature, made of insulating material, such as bakelite or similar electrical insulating material, and is adapted to fit over the link and is provided with spring gripping means for engaging on the link to hold the hood in position to protect the operator from the terminals and the link connecting the same. The hood also is provided with a projecting lug which fits in a recess in the side of the underground box so as to hold the hood in proper alinement above the connecting link and terminals. The hood forms a shield of insulating material and has side walls which project down sufficiently over the terminals and link to fully protect the operator, while working close quarters in the underground electric distribution box.

It is a feature to provide a connecting link having virtually identical side members which may be interchanged for each other and which are formed with marginal reinforcing flanges and cross ribs projecting between the same to reinforce the body of the side members. Suitable projecting bosses are positioned at the bolt holes which provide working faces for the heads of the bolts which hold the sides together. The links are so formed that they are identical. Each link is adapted to receive two bolts and one bolt opening in the respective links is threaded to receive the threaded end of the respective bolts. The links are also provided with a center recess which provides a cooling opening through the same when they are connected together by the terminals and which permits a tool to be inserted therein to lift the link off of the terminals or to place it on the same in attaching it.

The features of the link connecter and safety insulator which co-operate together will be more fully and clearly set forth.

In the drawings forming part of this specification:

Figure 1 illustrates a plan view of the electrical underground box for electric terminals with the cover removed, to illustrate the positioning of the links and some of the safety insulators shown therein.

Figure 2 is a side sectional view of the link and insulator in operative position in connection with some of the terminals, diagrammatically illustrating the same.

Figure 3 is an end view of the link safety shield or hood.

Figure 4 is a side view of one of the link connecters.

Figure 5 is a plan view of the link connecter.

Figure 6 is a plan view of the insulating hood for the connecter links and terminals.

Figure 7 is a side view of the insulating hood.

Figure 8 is a side view of my wrench and link removing tool.

The underground box A for electrical connections in which the connecters B are adapted to be used is illustrated looking down into the same in Figure 1. This shows the electrical terminals 10 positioned in the box A in a manner so that the connecters B may extend between the same and secured thereto so as to form an electrical connecter such as B to connect the terminals 10 to the terminals 10'.

The connecters B are made of two virtually identical members 11 which are held together by the bolts 12. The heads of the bolts 12 are adapted to work against the bosses 13 formed on the side of the body of the connecter B and the opening into which the bolt 12 extends is threaded at 14, while the portion 15 of the openings for the bolts 12 may be unthreaded to permit the bolt to rotate freely therein. The members 11 of the connecting link B may be positioned with the threaded portions 14 at opposite ends so that the bolts 12 may pass through from opposite sides of the members 11 and thus the members may be of the same nature so that one die will form the members 11, making them identical and reversible for universal use.

The members 11 of the connecter B are formed with marginal reinforcing ribs 16 which extend around the margin of the members 11. The center portion of the members 11 is formed with recesses 17 on the edges on both sides thereof, and a center cut-away portion 18 which extends transversely across the inside is formed in the members 11 so that the material is reduced between the ends of the members 11. When the members 11 are connected together as illustrated in Figure 5, a center opening or air passageway 19 is formed into which a tool may be inserted to engage the connecter B if it is desired.

The outer ends of the members 11 provide the clamping jaws for the connecter B and are formed with the curved jaws 20 of an arcuated nature or in the shape of the terminal such as 10 so as to clamp to the same. Reinforcing ribs 21 extend between the marginal ribs 15 transversely through the jaws 20 and similar transverse marginal ribs 22 are formed at the outer edges of the clamping jaws 20 which reinforce the jaws 20 to provide a strong clamping means for engaging over the terminals C.

The insulator hood C is formed of a long narrow nature with depending insulating side walls 23 which extend downwardly from the upper curved hood portion 24, so as to form depending insulating skirts such as 23 on each side of the main upper hood portion or curved part 24. The hood C is cut away at 25 to form a recess at one end and side of the same so that the hood will fit around the terminals 10 and connecters within the underground connecter box A. The cut-away portion 25 extends longitudinally through the center of the hood portion 24 along the line 26, then transversely from the center toward the side and down the side of the insulating skirt portions 23 along the line 27, so that the lines 26 and 27 extend virtually at right angles to each other. This provides a cut-away portion at one end of the hood, as is illustrated in the plan view of Figure 6 of the same.

The hood C is cut away also on one of the side skirts 23 at 28 to form a recess in the side of one of the skirts 23, as illustrated in the side view Figure 7 of the insulating hood C. This recess 28 is at the same end as the cut-away portion 25 and also is for the purpose of providing a recess such as 28, which fits over the terminals and connecter bars such as D which extend longitudinally along in the bottom of the underground box A. The hood C is formed with a depending lug 29 inside of the hood which carries the spring catch 30 depending inside of the hood portion 24 and which is adapted to engage on either side of the members 11 of the connecter B to hold the hood C over the connecter B when it is desired to shield the same. At one end the hood C is formed with a projecting lug 31, which is adapted to fit in the recess 32 in the side of the box A so as to hold the hood C in virtually a parallel position in relation to the connecter B above the same when it is attached thereto, as illustrated in Figure 2.

An engaging lug 33 is formed centrally on top of the hood C directly above the inner lug 29 so that the hood C may be engaged thereby when it is desired. In operation the hood C is used to shield the connecters B and the terminals 10 for the workmen when it is desired to work in the box A on other of the connecters B. This insulating shield C which is formed of bakelite or other suitable insulating material, fully and completely shields the operator so that he is protected against the terminals and the other connecters B, which are not covered by the shield C.

The links B may be adjusted to properly aline and space the same. This adjustment is provided by clamping the terminal lugs 10 adjustably on the connecting ends 34 of the terminals E, and clamping the terminal lugs 10' adjustably on the bus bars D. The lugs 10' may be set into alinement with the lugs 10 by sliding the lugs longitudinally along the bars D and tightening the same when opposite the ends 34 of the terminals E. The lugs 10 may be set to provide the proper distance between the lugs 10 and 10' to accommodate the link B. This setting may be accomplished by tightening the clamping portion 35 at the correct longitudinal distance along the end 34 to provide the desired spacing. This free adjustability of the terminal lugs in the box is an important feature in the applicant's distribution box A, as a much more accurate setting of the terminals 10 and 10' may be obtained with much less care in preparation.

In Figure 4 is illustrated the manner in which the links B are removed from and replaced in the distribution box A. The removing tool F is provided with a socket wrench head 36 which is positioned at one end of the tool and which is of proper size to accommodate the heads of the bolts 12 for tightening and loosening the same. The other end of the tool F is equipped with a T-shaped end 37, upon the shank 38 of which is fitted a collar 39 bearing an outwardly extending circumferential flange 40. A coil spring 42 holds the collar 39 and flange 40 normally against the T-end of the tool, the spring 42 encircling the shank 38.

When the tool F is to be used in supporting the connecting link B, the T-shaped end 37 is inserted through the opening 19 centrally between the links B. The flange 40 is of too great a diameter to pass through the opening 19, and the spring 42 compresses sufficiently to permit the end 37 to project through the opening 19 and be turned cross ways in the link where it recedes into the recesses 17 in the edges of the link. The spring 42 holds the link B against the end 37. As the turning of the head 37 out of the recesses 17 for the removal of the head from the opening 19 would necessitate the compressing of the coil spring 42, such turning occurs only when desired.

By locking the tool F in connection with the connecter B, the danger of a serious short circuit is obviated. Formerly, connecters have been removed by means of an insulated stick, which does not hold the connecter in any definite relationship. The connecter may be definitely manipulated, and supported firmly by means of my removal tool without any danger either of short circuit from dropping the link across the bus bars or other connecters within the box, or of injury to the operator.

In accordance with the patent statutes, I have set forth the best embodiment of the link connecter and safety insulation therefor, and while a particular construction and design is illustrated, this is only suggestive of carrying out the principles of the invention, and I desire to have it understood within the scope of the following claims.

I claim:

1. The combination, a link conductor, an insulating hood of an elongated nature adapted to extend longitudinally with and over said link and formed of insulating material throughout and having depending insulating skirts, and spring means on said hood engageable with said conductor for holding said hood to said link.

2. An electrical insulating shield for connecters including, an elongated channel-like hood member formed of insulating material, spring means depending from the inside thereof adapted to connect said hood to an electrical terminal, depending insulating skirt flanges formed on said hood to extend below the connecter to which the hood is adapted to be attached, and recesses formed in said skirt of said hood to permit the hood to be positioned over transversely extending connecters in the terminal box where the hood is used.

3. An insulating shield for electrical terminals including, an elongated channel hood portion, an engaging lug projecting from the top of said hood portion, and metal attaching spring means carried inside of said channel hood portion, and elongated parallelly extending depending insulating skirt portions to extend completely over and below connecters and terminals when said hood is in use.

4. A shield comprising, an insulation hood substantially of an inverted U-shape, a lip extending from one end of said hood for engagement with a fixed shoulder to prevent rotation, a spring clip secured in said hood and cut-away portions in said hood.

5. A shield in combination with a distribution box having a number of conductors, including a hood having depending parallel sides, a lip engageable with the side of the distribution box to prevent rotation of the hood, a spring clip engageable with one of said conductors secured within said hood, and cut away portions in said hood and sides to permit said shield to fit over others of said conductors.

JOSEPH C. RAH.